[12] United States Patent
Lin et al.

(10) Patent No.: US 7,558,484 B2
(45) Date of Patent: Jul. 7, 2009

(54) ULTRA-WIDE BAND WIRELESS SYSTEM

(75) Inventors: Wen-Piao Lin, Gueishan Township (TW); Jun-Yu Chen, Gueishan Township (TW)

(73) Assignee: Chang Gung Memorial University, Gueishan Township, Taoyuan County (TW)

( * ) Notice: Subject to any disclaimer, the term of this patent is extended or adjusted under 35 U.S.C. 154(b) by 598 days.

(21) Appl. No.: 11/369,136

(22) Filed: Mar. 6, 2006

(65) Prior Publication Data

US 2007/0206951 A1 Sep. 6, 2007

(51) Int. Cl.
*H04B 10/00* (2006.01)

(52) U.S. Cl. .................. 398/115; 398/116; 398/117; 398/118; 398/66; 398/67; 398/68; 398/69; 398/72; 398/100; 455/426.1; 455/12.1; 455/13.1; 370/338; 370/465; 370/466; 372/30; 372/31

(58) Field of Classification Search .................. 398/115, 398/138, 127, 139, 135, 136, 137, 140, 141, 398/183, 202, 208, 209, 118, 116, 66, 67, 398/68, 69, 70, 71, 72, 76, 79, 98, 99, 100, 398/103, 119, 117; 372/30, 31; 370/338, 370/465, 466, 328; 455/426.1, 103, 12.1, 455/13.1, 3.1, 6.1
See application file for complete search history.

(56) References Cited

U.S. PATENT DOCUMENTS

| 7,260,126 | B2 * | 8/2007 | Wang et al. | 372/30 |
|---|---|---|---|---|
| 7,349,633 | B2 * | 3/2008 | Lee et al. | 398/115 |
| 7,366,150 | B2 * | 4/2008 | Lee et al. | 370/338 |
| 2003/0076136 | A1 | 4/2003 | McCorkle et al. | 327/112 |
| 2005/0047480 | A1 | 3/2005 | Carbonari | 375/130 |
| 2005/0131922 | A1 | 6/2005 | Kennedy et al. | 707/100 |
| 2005/0175357 | A1 * | 8/2005 | Kawanishi et al. | 398/187 |

* cited by examiner

*Primary Examiner*—Hanh Phan
(74) *Attorney, Agent, or Firm*—C. G. Mersereau; Nikolai & Mersereau, P.A.

(57) ABSTRACT

The present invention provides a kind of ultra-wide band wireless system, which changes the previous electronic structure for ultra-wide band pulse generator, and uses light to generate pulse signal, transformed by microwave differentiator to Gaussian monocycle pulse transmission signal, the derived pulse signal can provide several GHz bandwidth to transmit fast speed information, and further complete the new ultra-wide band wireless system. It reduces the complexity of electronic system and enhances output signal quality by means of light property, with considerable leading advantage. And the signal generated by this system has broader band and no infringe property, its 10 dB band falls within the range prescribed by the Federal Communication Committee of United States (FCC), successfully realizing the ultra wide band fiberoptic wireless collection network system, and further attaining the goal of seamless communication collection.

5 Claims, 8 Drawing Sheets

ULTRA-WIDE BAND WIRELESS SYSTEM

BACKGROUND OF INVENTION

1. Field of the Invention

The present invention relates generally to an Ultra-Wide Band (UWB) wireless system, and more particularly to one which can produce high-quality Gaussian monocycle pulse trains to be used for high speed wireless transfer system in the future.

2. Description of Related Art

Ultra-Wide Band (UWB) wireless telecommunication system has been one of the focuses of attention-in the field of the latest wireless telecommunication. It is capable of high-bit-rate data transfer, and can be applied to household appliances such as audio-video equipments, digital TV, PC, or PDA. It can be used to link up the different devices and transmit the information among them. What's more, it can coexist with other existing communication systems. As a result, it has been favored in the wireless telecommunications. However, to generate pulses to be transmitted, Ultra-Wide Band (UWB) wireless telecommunication often relies on electronic devices, which have difficulty in generating such Ultra-Wide Band (UWB) pulses. On the contrary, optical signal is high-frequency signal, and has wide bandwidth, so it is easier for optical devices to generate Ultra-Wide Band (UWB) pulses than for electronic devices.

Of the available literatures concerning Ultra-Wide Band (UWB) system, McCorkle, John W.; Huynh, Phuong T.; Ochoa, Agustin demonstrate in MONOCYCLE GENERATOR (patented and published in April 2003, and numbered US 20030076136) that an Ultra-Wide Band (UWB) wireless system of Gaussian monocycle pulse as realized by way of electronic devices is of considerable commercial value.

And Carbonari, David certified in ULTRA WIDEBAND TRANSMITTER (patented and published in March 2005, and numbered US 20050047480) that a simple Ultra-Wide Band (UWB) wireless transmitter of Gaussian monocycle pulse can be of very great potential.

In addition, Kennedy, Philip T.; Melick, Bruce D.; Snyder, David M.; Baych, Leslie D. presented in HIGH BANDWIDTH DATA TRANSPORT SYSTEM (patented and published in June 2005, and numbered US20050131922) their discovery that Ultra-Wide Band pulse can be employed to transport data via different media, that it can be applied to optical fiber transport, cable TV line transport and so on, and that Ultra-Wide Band signal is highly commercial for its wider applicability in transporting data.

In future digitalized household, electronic devices, PCs and wireless devices can be used for people to share, within the household or at a greater distance, photos, music, audio and video materials via networks. Ultra-Wide Band (UWB) system is regarded as excellent next generation of short-distance wireless indoor communication technique that is characterized by its low power consumption and high-speed data transport. As indicated by IEEE 802.15.3a standard, Ultra-Wide Band (UWB) system is permitted, in a definite way, to be operable in frequency ranges between 3.1 and 10.6 GHz. The system can also occupy a bandwidth greater than the center frequency 20% or at least a 500 MHz bandwidth. Since 1970s, wireless pulse techniques have been used in the development of the military communication system, and in recent years, these techniques have been allowed to be developed into high-performance wireless system and to be gradually commercialized. Furthermore, U.S. Federal Communication Committee (FCC) has mapped out the Ultra-Wide Band (UWB) system and thus is provided mature wireless pulse application.

Wireless carrier wave modulation is an appealing technology for wireless transport system because it does not need any complicated frequency mixer, intermediate frequency and filter circuits. Besides, expenses are lowered to a considerable extent. And fundamental frequency transport possesses better penetrability and thus is more suitable for indoor wireless communication system. In former times, some complicated electronic circuits and radio frequency components are adopted for wireless pulse communication to generate serial pulse signals. For example, FIGS. 1 and 2 show the traditional electric pulse generating devices.

In addition, in June 2002, on pages 206-208 of the twelfth volume of IEEE Microwave and Guided Wave Letters, Jeongwoo Han and Cam Nguyen put forward an electronic device that used a simple RC high-pass filter as a differentiator to generate Gaussian monocycle pulse.

In May 2004 issue of Circuits and Systems, 2004, ISCAS '04 and on pages 129-32 of the fourth volume of Proceedings of the 2004 International Symposium, Youngkyun Jeong, Sungyong Jung, Jin Liu came up with a Gaussian monocycle pulse generator by way of UMC 0.18 (μm) CMOS. The generator thus made is simpler and can generate pulses of wider bandwidth.

SUMMARY OF THE INVENTION

The technological problems that the invention aims at solving:

1. The traditional electrical pulse generating devices as shown in FIGS. 1 and 2 are disadvantaged in that the pulses thus generated are high in ringing and that the high frequency electronic circuit is very complicated.

2. The method proposed by Jeongwoo Han and Cam Nguyen in the aforementioned paper can produce the desired signals but the signals thus generated are of narrower bandwidth and are accompanied by much ringing.

3. The Gaussian monocycle pulse generator put forward by Youngkyun Jeong, Sungyong Jung, Jin Liu in the aforementioned paper is simple in structure and can produce pulses of wider bandwidth. The −10 dB bandwidth range, however, does not fall within required norm and thus this kind of pulse generator does not belong to the Ultra-Wide Band (UWB) system as mapped out by U.S. Federal Communication Committee.

Technological features of the invention: the invention aims to provide an Ultra-Wide Band (UWB) wireless system including the following:

Central Station generates Gaussian optical pulse. Gaussian optical pulse signals are produced by using optical components comprised mainly of inexpensive Fabry-Perot laser diode of plus switch type, adjustable filter (TF), erbium-based optical fiber amplifier (EDFA) and Mach-Zehnder optic modulator (MZM). Fabry-Perot laser diode generates Gaussian optical pulse signals by adjusting the voltage deviation of the direct current and the radio frequency signals. The high speed digital data are carried by optical pulses via optical modulator. In this way digital transmission is realized.

Base Station can generate Ultra-Wide Band (UWB) pulse. Base Station can receive the digital transmission from the abovementioned central station. Base Station consists mainly of PIN photodiode, first order microwave differentiator and Butterworth highpass filter. The optical pulses transmitted at Central Station are converted into Gaussian monocycle pulse signals via PIN photodiode and fist order microwave differentiator, then Ultra-Wide Band (UWB) pulses are generated via highpass filter.

What is beneficial is that the Erbium-doped optical fiber amplifier (EDFA) at Central Station is composed of a 980 nm pump laser, Erbium-doped optical fiber (EDF) and an optical isolator. Erbium-doped optical fiber amplifier (EDFA) in the system is used as an outer injection source and an amplifier of Fabry-Perot laser diode.

And the adjustable filter (TF) at Central Station is used as a wave selector.

By means of the outer injection light source and amplifier of Fabry-Perot laser diode, optical pulse train is produced and then the optical pulse train signals are converted into electrical pulse train signals with the help of PIN photodiode. After this, Ultra-Wide Band (UWB) Gaussian monocycle pulse signals are generated via an amplifier and a linear microwave differentiator.

The linear microwave differentiator is first order microwave differentiator that is capable of molding the short pulse waves into Gaussian monocycle pulse wireless signals.

The_first order microwave differentiator is designed in the form of discrete-time infinite impulse response (IIR). The system function is as follows ($z^{-1}$ is the unit time lag):

$$G(z) = 0.5659 \frac{1 - z^{-1}}{1 - 0.1319 z^{-1}}$$

After the system function of discrete time is defined, the equal system function is expressed by the transition function of the transmission line so that its circuit length can be obtained. A transmission line is used in parallel connection with a short circuit stub. The transition function of the short circuit stub connected in parallel ($T(z)$) is expressed in the following ($Z_b$ is the characteristic impedance of the short circuit stub connected in parallel, $Z_0$ is the referential characteristic impedance):

$$T(z) = \frac{1 - z^{-1}}{(1 + c) - (1 - c)z^{-1}}, \quad c = Z_0 / 2Z_b$$

Supposing $T(z)$ is equal to $G(z)$, then the results of c and $Z_b$ can be obtained: c=0.767 and $Z_b=Z_0/1.534$. $Z_b=32.589\Omega$ can be derived from $Z_0=50\Omega$ by applying the formula. Based on the impedance value, the actual components of the first order microwave differentiator are designed with a 25N Arlon circuit board that is 30 mil (0.762 mm) in thickness and whose dielectric coefficient stands at $\epsilon_r=3.38$.

After they go through high speed Fourier transition (FFT), and when their power spectrum density (PSD) is –51.3 (dBm/MHz), the frequency spectrum of Ultra-Wide Band (UWB) pulses produced at Base Station will be distributed among the ranges of 3.1-10.6 (GHz).

The Gaussian optical pulse signals generated at Central Station are transmitted to Base Station via optical fiber.

In contrast with the former technology, the present invention provides a brand-new optical device to generate Gaussian monocycle pulse that conforms to U.S. FCC norms for Ultra-Wide Band (UWB) pulses. The actual construction of the device and the experiments have proved that the system structure thus provided can yield high quality pulse train signals and at the same time the transmitter will be far less complicated.

The above explanation serves as a summary of some of the characteristics of the invented device. In order that the distinguished jurors and professionals reading the manual can better understand and implement the technological elements involved in the invented device, the explanation is made with the help of icons. The following description only serves to explain the better embodiment of the invention and does not impose any restriction on the forms of the invented device. Any modification or alteration of the invented device based on the same principle of creation should be included into the protection of the invention.

DETAILED DESCRIPTION OF THE INVENTION

The invention relates to an Ultra-Wide Band (UWB) wireless system. As shown in FIG. 3, the system consists of Central Station that generates Gaussian optical pulses and Base Station that can generate Ultra-Wide Band (UWB) pulses. By using optical components, Central Station produces Gaussian optical pulses signals, which are then transmitted to Base Station via simple module optical fiber and converted into Ultra-Wide Band (UWB) electrical pulse signals at Base Station.

Central Station is comprised mainly of inexpensive Fabry-Perot laser diode of plus switch type, adjustable filter (TF), Erbium-doped optical fiber amplifier (EDFA) and Mach-Zehnder optic modulator (MZM). Fabry-Perot laser diode generates Gaussian optical pulses signals by adjusting the voltage deviation of the direct current and the radio frequency signals. The high-speed digital data are carried by optical pulses via optical modulator. In this way, digital transmission is realized.

Base Station consists mainly of PIN photodiode, first order microwave differentiator and highpass filter. The optical pulses transmitted at Central Station are converted into Gaussian monocycle pulse signals via PIN photodiode and first order microwave differentiator. Then Ultra-Wide Band (UWB) pulses that conform to U.S. FCC norms are generated via highpass filter. After these pulses go through high speed Fourier transition (FFT), and when their power spectrum density (PSD) is –51.3 (dBm/MHz), the frequency spectrum of Ultra-Wide Band (UWB) pulses will be distributed among the ranges of 3.1-10.6 (GHz).

As shown in FIG. 3, Ultra-Wide Band (UWB) Gaussian monocycle pulse signal system is constructed on optical basis. Components such as Fabry-Perot laser diode of plus switch type, adjustable filter (TF), and Erbium-doped optical fiber amplifier (EDFA) are employed as optical basis. By means of the outer injection light source and amplifier of Fabry-Perot laser diode, optical pulse train is produced The Erbium-doped optical fiber amplifier is comprised of a 980 nm pump laser, Erbium-doped optical fiber (EDF) and a light splitter.

In this system, the Erbium-doped optical fiber amplifier acts as an external input source and an amplifier for Fabry-Perot laser diode, the tunable filter acts as a wavelength selector. The external input device can be regarded as a laser source inputting tunable continuous wave from outside, when the input wavelength equals to that of laser wave module of Fabry-Perot diode, a single wavelength light pulse signal can be formed, in this way a better sidemode suppression ratio (SMSR) can be acquired. While at the transmission end, a PIN photodiode (PD) converts the light pulse train signal into the electronic pulse train signal, followed by an amplifier and a linear microwave differentiator, the ultra high frequency Gaussian monocycle pulse radio signal is generated.

In the present invention, a differentiator is designed to generate Gaussian monocycle pulse signal to realize the ultra-wide band wireless system. Referencing the past study paper, it is known that the Gaussian monocycle pulse signal can provide broader bandwidth of 3 dB, better Bit Error Rate (BER) and multiple path performance. Therefore, a first order microwave differentiator is used to transform the short pulse wave into the Gaussian monocycle pulse signal. The design focuses on broadband linearity and circuit simplicity, so the microstrip line is utilized to make the first order microwave differentiator. Most of Discrete time Signal Processing (DSP) technique studies have detailed application and analyses of differentiator, first order differentiation as a time derivative of signal in Laplace transformation can be denoted by a compound frequency constant, s, i.e., s=jω (where ω is the angle frequency of signal). The differentiator can be regarded as a highpass filter, when the signal frequency increases, the system function amplitude has linear increment, which can be deemed as differentiation. Currently there are several methods to design the microwave differentiator, while in the present invention, the infinite pulse impact response of discrete time (IIR) is used to design first order differentiator, where the following function is chosen:

$$G(z) = 0.5659 \frac{1 - z^{-1}}{1 - 0.1319 z^{-1}} \quad (1)$$

In expression (1), $z^{-1}$ is the unit time delay. After defining the system function of discrete time, the transformation function of transmission line is used to represent equal system function to obtain its circuit length, so it is expressed by means of a transmission line paralleled with a short-circuit fragment as shown in FIG. 4, where the transformation function of parallel short-circuit fragment T(z) is shown in equation (2):

$$T(z) = \frac{1 - z^{-1}}{(1 + c) - (1 - c)z^{-1}}, \quad c = Z_0 / 2Z_b \quad (2)$$

In expression (2), $Z_b$ is the characteristic impedance of parallel short-circuit fragment and $Z_0$ is the reference characteristic impedance.

Suppose T(z) equals to G(z), then c=0.767 and $Z_b=Z_0/1.534$, when $Z_0=50\Omega$, apply the above formula to obtain $Z_b=32.589\Omega$, based on this impedance, use 25N Arlon PCB with a thickness of 30 mil (0.762 mm) and a dielectric constant єhd r=3.38 to complete the design of first order microwave differentiator whose actual components are shown in FIG. 5.

The impact on transmission coefficient $S_{21}(f)$ after measurement comparison in accordance with frequency from dc to 7 GHz is shown in FIG. 6.

It can be observed from the measurement, the measured $S_{21}(f)$ tends to be equal to the theoretical value, and has linear increment as frequency increases, therefore the fabrication of a passive microwave differentiator is verified.

According to the present invention, build the experiment apparatus as shown in FIG. 3, and run Gaussian monocycle pulse signal test. Firstly, use a gain switch Fabry-Perot laser diode to produce light pulse signal, where Fabry-Perot laser diode (Appointech Inc.) is a component with 18 mA cutoff current at 25° C., 0.8 nm pitch and a wavelength of 1550 nm. The Bias-Tee loads the RF signal into Fabry-Perot laser diode and adjusts it to gain switch mode. In case of 4 GHz 2 dBm amplitude RF signal, the Fabry-Perot laser diode has gain switch phenomenon at 16 mA; FIG. 7(a) shows the spectrum of gain switch Fabry-Perot laser diode. And the Erbium-doped fiber amplifier (EDFA) is used as an external input source and an amplifier of Fabry-Perot laser diode, hence the laser field module of Fabry-Perot laser diode can be locked by amplified spontaneous emission (ASE) due to EDFA feedback, the result is shown in FIG. 7(b), when 980 nm pump power is 45 mW, the sidemode suppression ratio (SMSR) is about 37 dB. Spectra of Fabry-Perot laser diode derived after tunable filter (TB4500, JDS Uniphase Inc.) is shown in FIG. 7(c), the laser wavelength is 1556.24 nm, according to the test result. When ASE input power increases, SMSR gets bigger also.

In order to realize Gaussian monocycle pulse signal, the PIN photodiode transforms optical pulse signal into electric pulse signal at the optical receiving end, and passes microwave differentiator to produce the Gaussian monocycle pulse signal, the test result is shown in FIG. 8: 4 GHz electric pulse signal and Gaussian monocycle cycle pulse signal derived by passing differentiator goes through PIN photodiode, the amplitude of electric pulse signal is 200 mV (−1 dBm), the amplitude of pulse signal produced after microwave differentiator is 72.5 mV (−9.78 dBm), as the designed microwave differentiator is a passive component, so it can be known from test result that 4 GHz signal attenuates about 8.78 dB after passing microwave differentiator and has a time delay of 0.33 ns. Then use broadband oscilloscope (Agilent 86100) to collect actual data of Gaussian monocycle pulse signal, and goes through Fast Fourier Transformation (FFT) by Matlab software, where the power spectra density (PSD) of pulse signal is shown as solid line in FIG. 9, it can be seen that after passing first order microwave differentiator the center frequency is about 4.9 GHz, and the bandwidth of −51.3 dBm/MHz point ranges from 1.08 GHz to 10.5 GHz, from above result, the lower frequency band does not conform FCC regulation. Therefore, a fifth order Butterworth highpass filter (HPF) is designed, −3 dB band is 3.8 GHz, set behind the differentiator. After second test and FFT analysis, the result is shown as dash line in FIG. 9; its frequency spectrum falls right within 3.1-10.6 GHz band which conform FCC regulation.

Finally, in order to verify its feasibility of passing data, an amplifier is needed at the transmission end to amplify the power of Gaussian monocycle pulse signal until its emission power meets IEEE 802.15.3a restriction, and data loading rate should be over 500 Mbit/s. So a 4 GHz radio signal is input into Pattern Generator to export data, loaded to the system by optic module actuator (H301, JDS Uniphase Co.) feeding in Mach-Zehnder modulator (MZM, OC-192-modulator, JDS Uniphase Co.), and tuned by a polarity controller (PC) and bias ($V_{bias}$) to get better light pulse signal. When the bias is 3.8V, reduction of Gaussian monocycle pulse signal infringe can get high power pulse signal more parallel with DC baseline, and it is easier to distinguish train symbols of pulse signal ("0" and "1"). The system uses On/Off key (OOK) modulation and every 8 pulse signals represent 1 bit, pass 500 Mbit/s modulation data, load to Mach-Zehnder modulator, and amplify its output power at transmission end by amplifier until conformance with maximum effective isotropic radiation power (EIRP) in compliance with FCC, that is, −41.3 dBm, and further export with ideal antenna, and get actual data of output OOK modulation, use Matlab simulation to pass a single extra white Gaussian noise channel, and demodulate the data, complete the receiving of receiver end. As for data demodulation method, use related receiver to integrate signal energy and allow amplitude checked by amplitude detector, and determine if the signal denote "0" or "1", then restore the transmitted data. FIG. 10 is the graph of signal noise ratio ($E_b/N_0$) of bit error rate (BER) over bit after simulation of passing channel, it's known from FIG. 8 that when bit error rate is $10^{-6}$, the bit signal noise ratio reaches 22.5 dB, which proves the present invention is a good ultra wide band wireless system with ultra broad frequency Gaussian monocycle pulse signal and OOK modulation.

The above experiments confirm that the present invention is a new, feasible and simple infrastructure, which can generate high quality ultra-wide band pulse train signal in compliance with specification; it has a business value indeed. When house-to-house fiberoptic communication is realized in future, it will raise transmission rate, and widen internet application, if building a ultra-wide band wireless transceiver at user terminal on this basis, the transmission and receiving in maximum distance can be obtained, so such a kind of fiberoptic wireless internet infrastructure is really a system worthy of expectation in future, and the present invention has not been reported in any other periodicals, therefore it fully conforms the legal elements of invention patent, hereby the patent application is filed.

Figure 1:
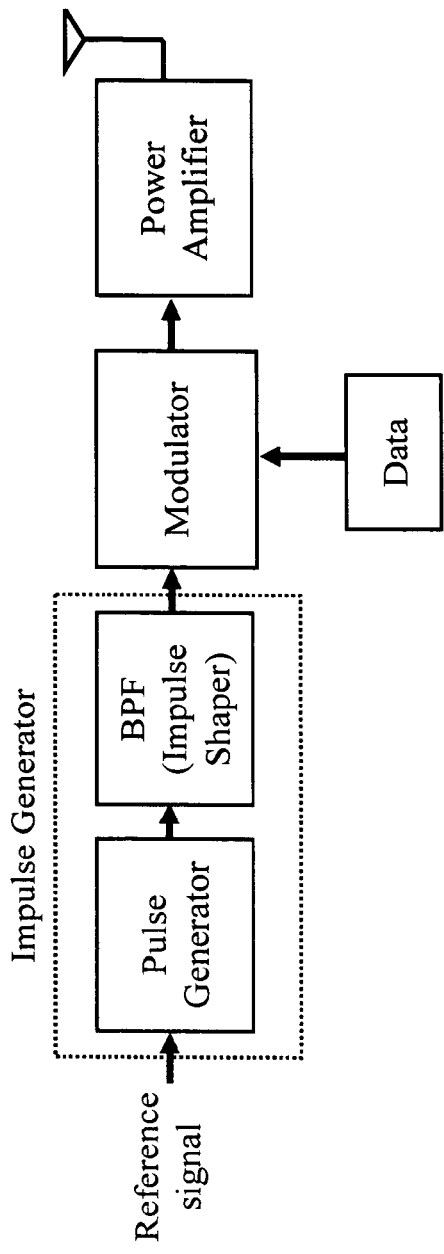
FIG. 1 shows the block diagram of electronic ultra-wide band pulse transmitter.
Figure 2:
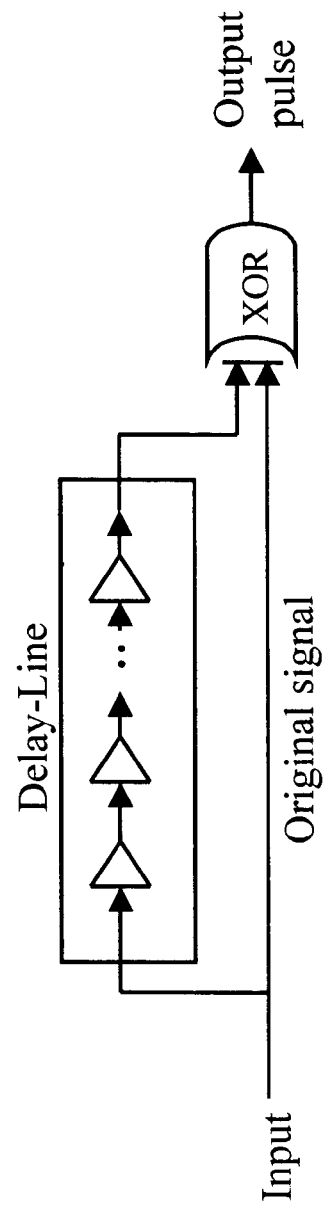
FIG. 2 shows the block diagram of ultra-wide band pulse generation.
Figure 3:
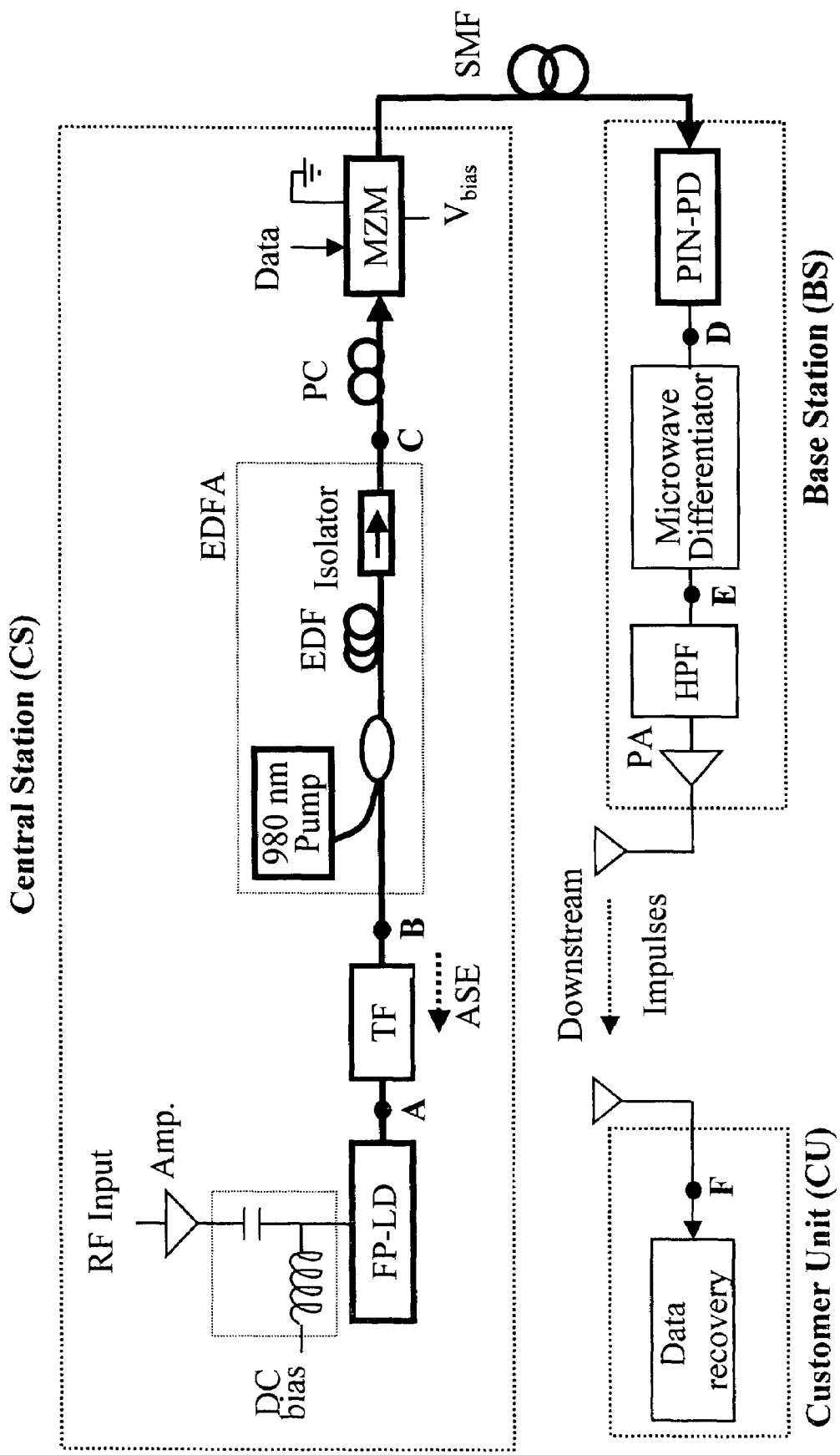
FIG. 3 shows a diagram of ultra-wide band Gaussian monocycle pulse signal system infrastructure of the present invention.
Figure 4:
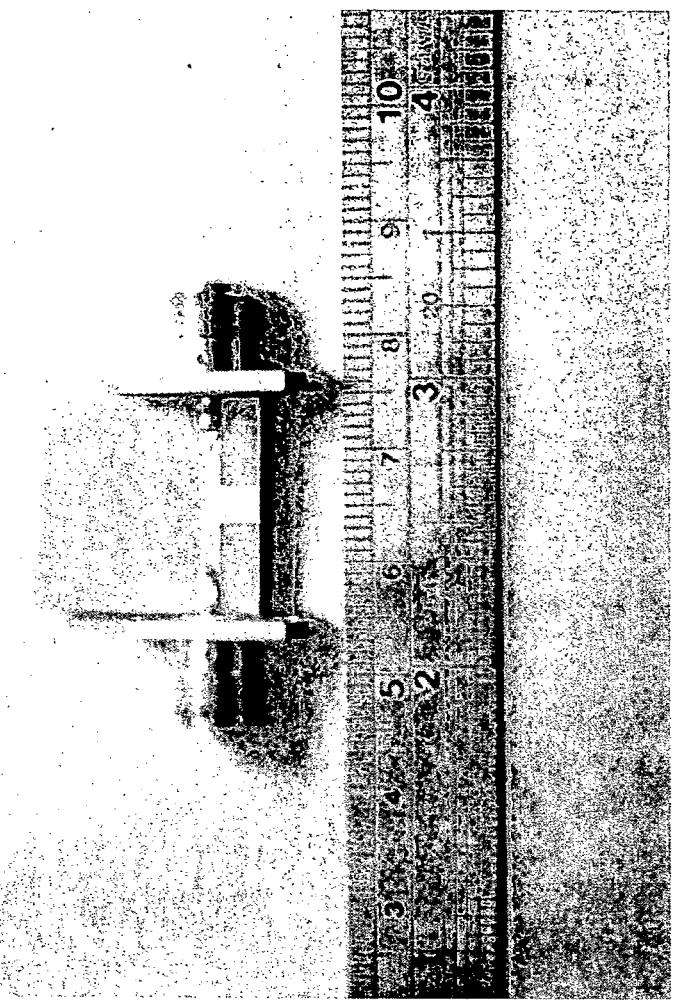
FIG. 4 shows a diagram of parallel short-circuit fragment in the present invention.
Figure 5:
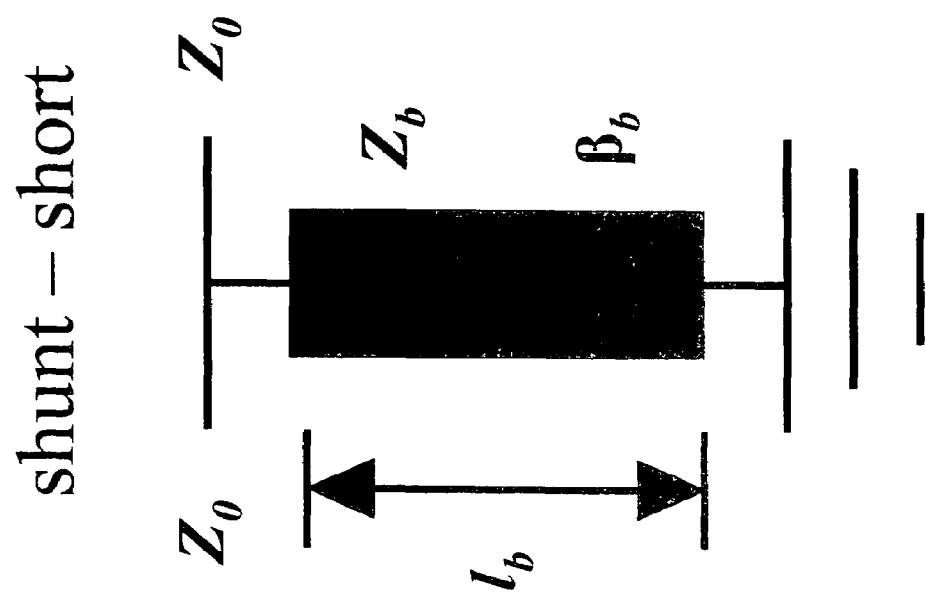
FIG. 5 shows a diagram of completed components of differentiator in the present invention.
Figure 6:
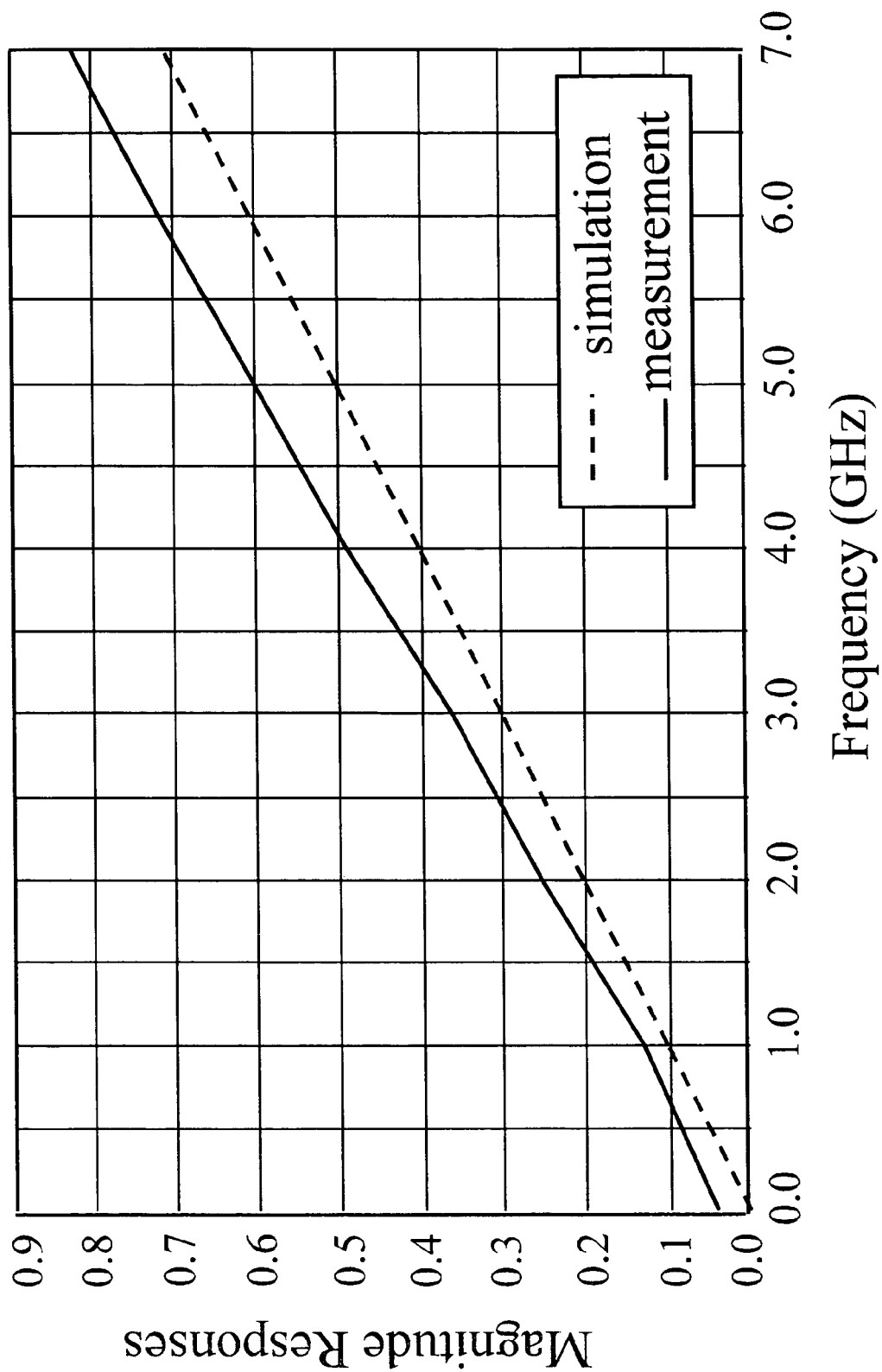
FIG. 6 shows a diagram of response of test measurements and theoretical value of $S_{21}(f)$ of differentiator in the present invention.
Figure 7:
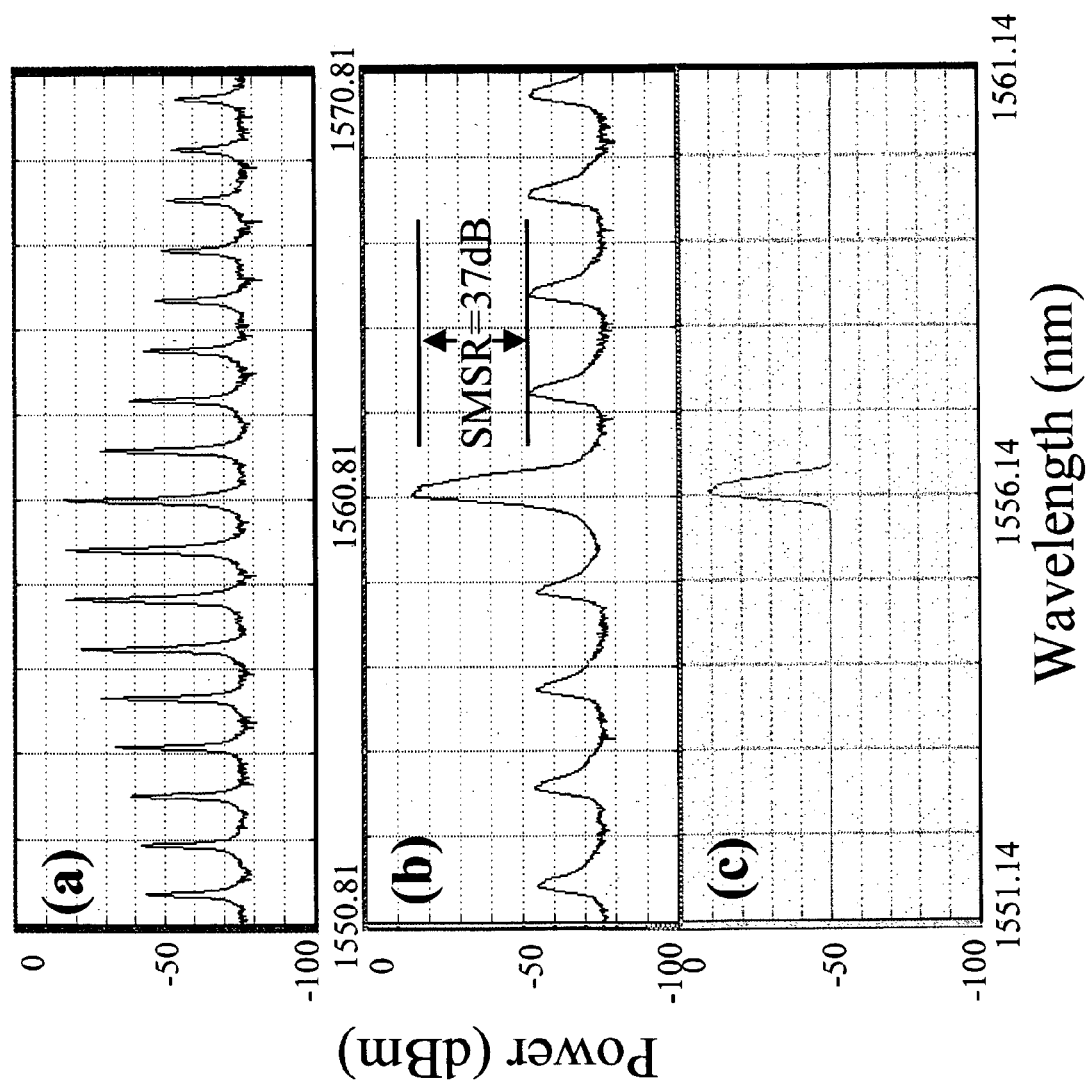
FIG. 7 shows spectra of various points after 4 GHz RF signal loading into Fabry-Perot laser diode, showing point A in (a), point B in (b) and point C in (c).
Figure 8:
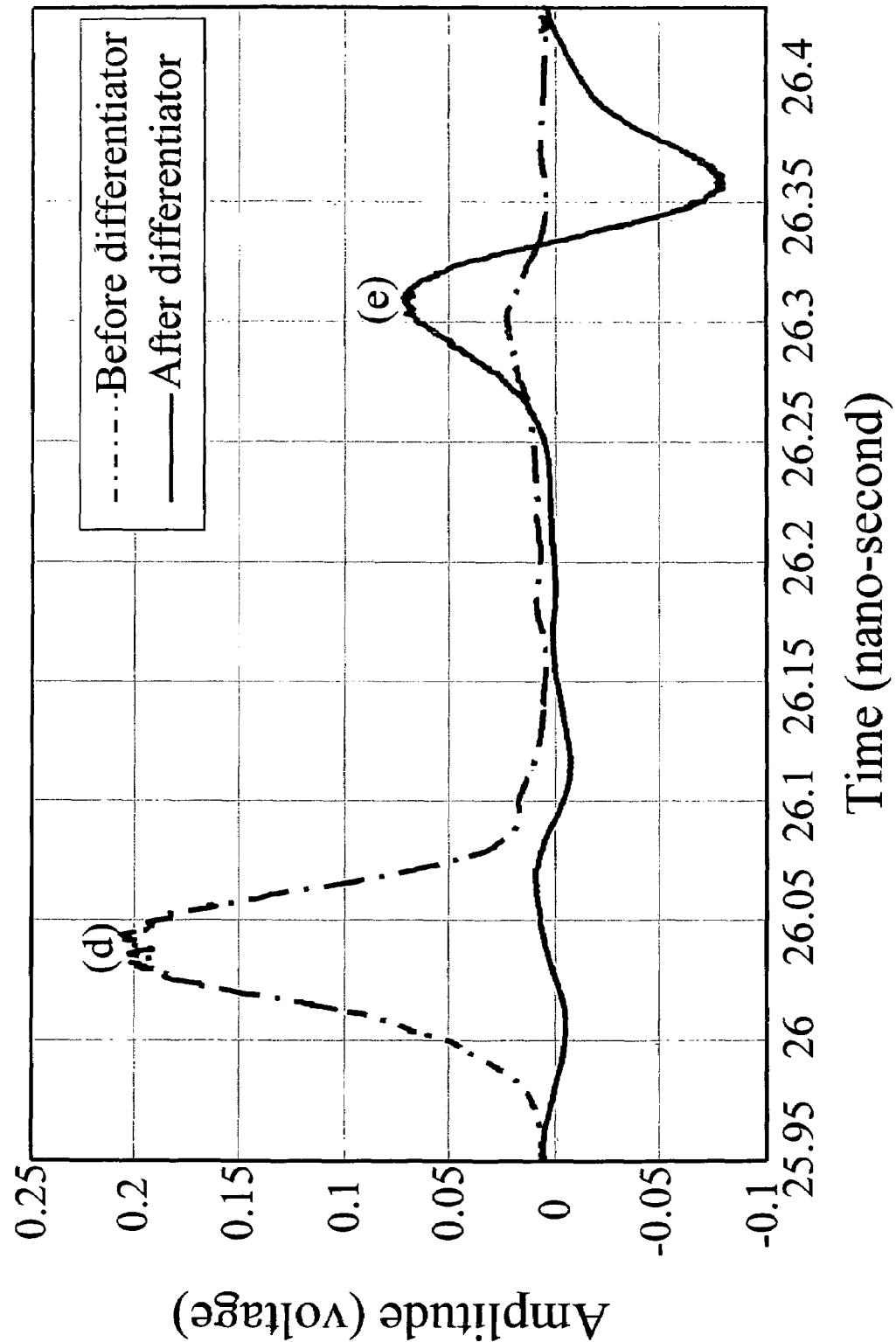
FIG. 8 shows pulses of various points measured by sampling oscilloscope, representing point D in (d) and point E in (e).
Figure 9:
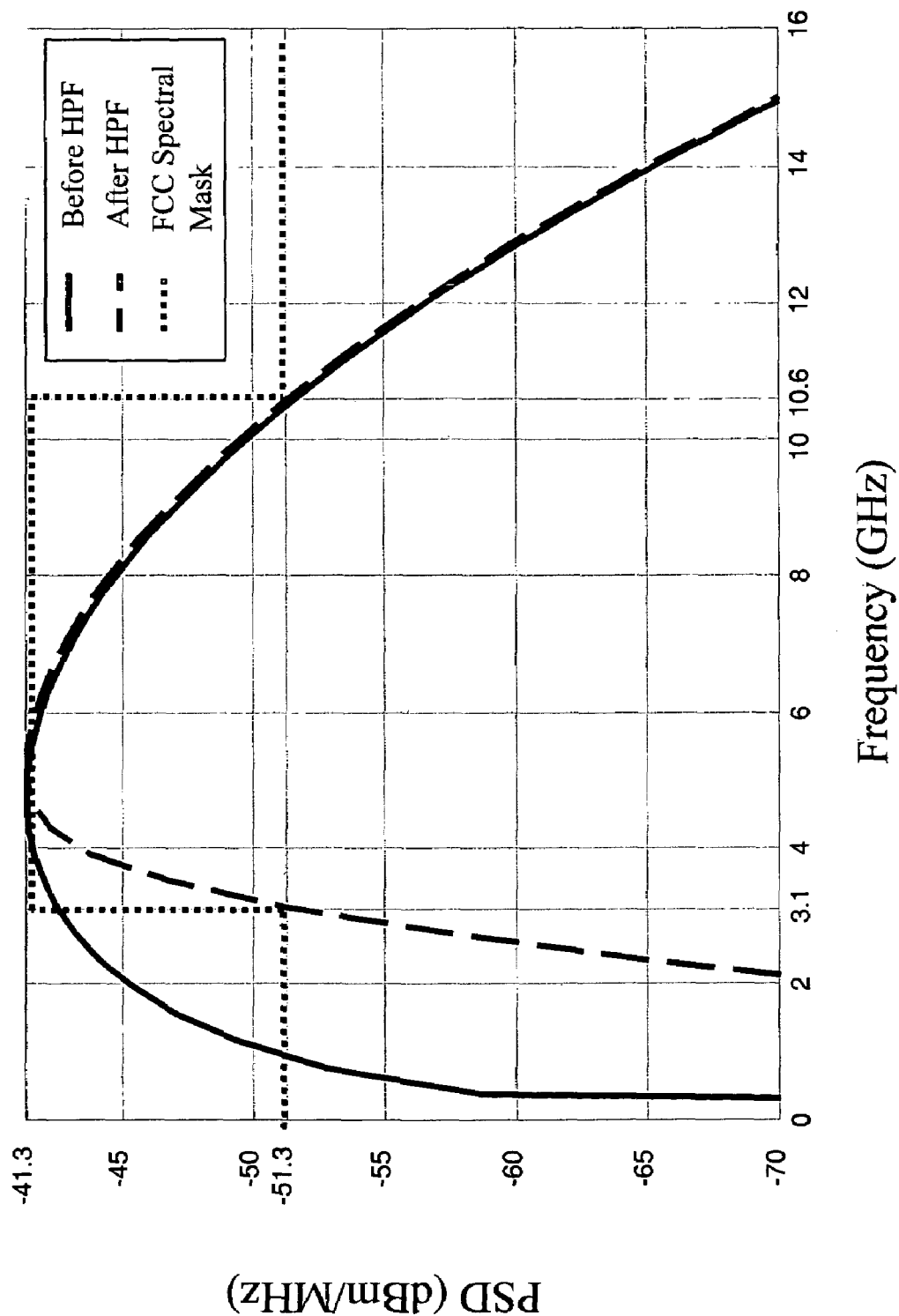
FIG. 9 shows a diagram of normalized power spectra density of Gaussian monocycle pulse after differentiator without and with a fifth order Butterworth highpass filter.
Figure 10:
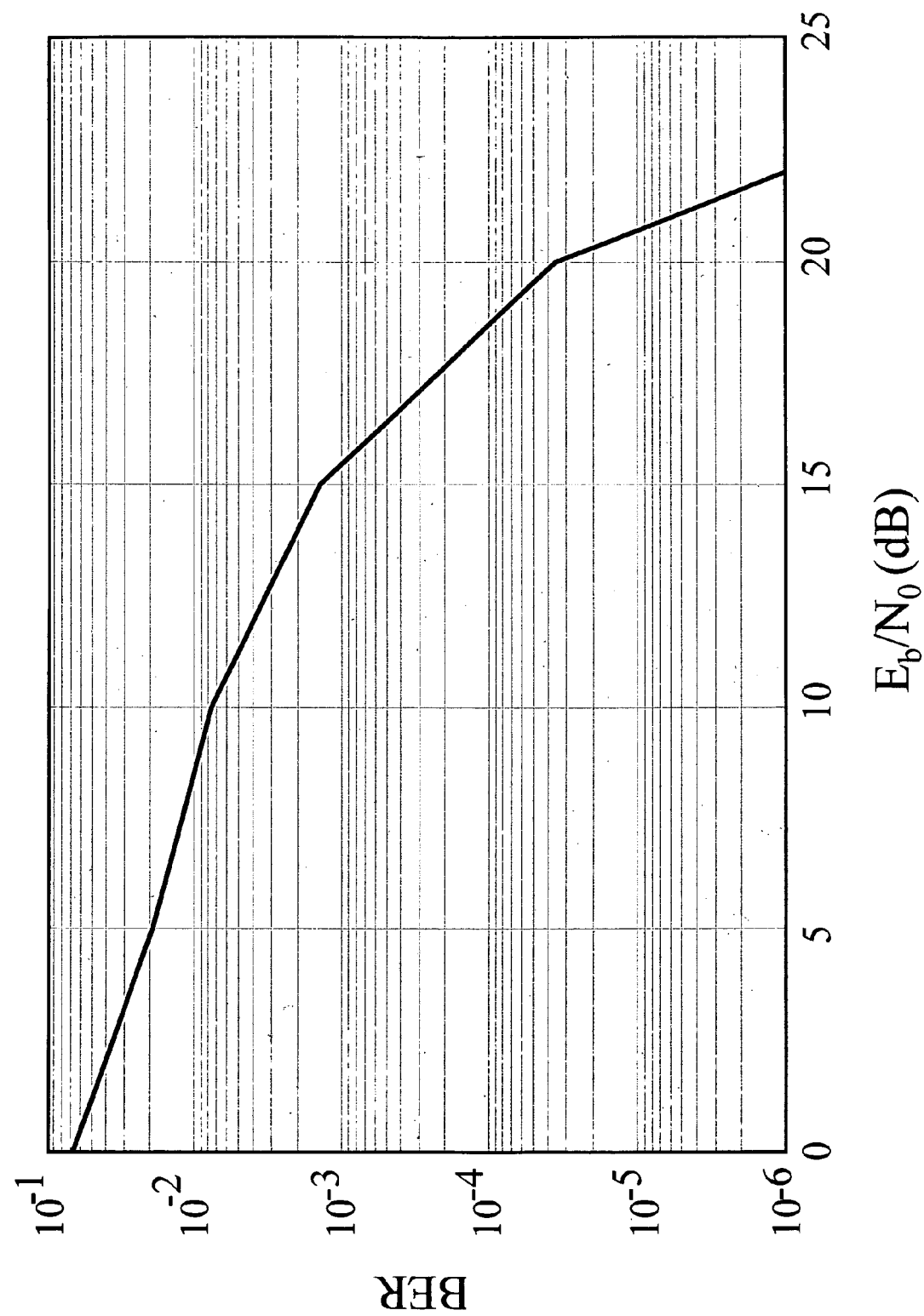
FIG. 10 shows a diagram of BER over bit S/N ratio ($E_b/N_0$) of 500 Mbit/s OOK modulation data-simulated at point F in FIG. 1.

What is claimed is:

1. A Ultra-Wide Band (UWB) wireless system, comprising:
    a central station, which can generate Gaussian light pulses, uses optic components to produce Gaussian light pulse signals, primarily comprised of a gain-switched Fabry-Perot laser diode, tunable filter (TF), Erbium-doped optical fiber amplifier (EDFA) and Mach-Zehnder modulator (MZM), where said Fabry-Perot laser diode generates Gaussian light pulse signals after subjecting to DC bias and RF signal tuning, fast speed bit data are loaded into light pulse by modulator to run bit transmission;
    a base station, which can generate ultra wide band pulse, receive bit transmission of aforesaid central station, and is primarily comprised of PIN photodiode, first order microwave differentiator and highpass filter, transforming light pulse from central station into Gaussian monocycle pulse signal through PIN photodiode and first order microwave differentiator, and passing highpass filter to produce ultra wide band pulse;
    wherein the EDFA of the central station acts as external input light source and amplifier of Fabry-Perot laser diode are used to generate light pulse trains, transformed into an electronic pulse train signal by a PIN photodiode (PD), through an amplifier and linear microwave differentiator, to generate ultra-wide band Gaussian monocycle pulse radio signals;
    wherein the linear microwave differentiator can be a first order microwave differentiator, which can transform short pulse to Gaussian monocycle pulse signal;
    wherein the first order microwave differentiator utilizes discrete time infinite pulse impact response (IIR) in design, choosing system function as follows, where $z^{-1}$ is unit time delay:

$$G(z) = 0.5659 \frac{1-z^{-1}}{1-0.1319z^{-1}}$$

after defining the system function of discrete time, the transformation function of transmission line is used to represent equal system function to obtain its circuit length, so it is expressed by means of a transmission line paralleled with a short-circuit fragment, where the transformation function of parallel short-circuit fragment T(z) is shown as follows, where $Z_b$ is the characteristic impedance of parallel short-circuit fragment and $Z_0$ is the reference characteristic impedance;

$$T(z) = \frac{1-z^{-1}}{(1+c)-(1-c)z^{-1}}, \quad c = Z_0/2Z_b$$

suppose T(z) equals to G(z), c=0.767 and $Z_b=Z_0/1.534$, when $Z_0=50\Omega$, apply the above formula to obtain $Z_b=32.589\Omega$, based on this impedance, use 25N Arlon PCB with a thickness of 30 mil (0.762 mm) and a dielectric constant $\epsilon_r=3.38$ to complete the design of first order microwave differentiator.

2. The Ultra-Wide Band (UWB) wireless system defined in claim 1, wherein Erbium-doped fiber amplifier (EDFA) of central station, is comprised of 980 nm pump laser, EDF and light splitter, where the EDFA acts as external input source and amplifier for Fabry-Perot laser diode.

3. The Ultra-Wide band (UWB) wireless system defined in claim 1, wherein the tunable filter (TF) of central station acts as a wavelength selector.

4. The Ultra-Wide Band (UWB) wireless system defined in claim 1, wherein the ultra-wide band pulse from base station is subject to Fast Fourier Transformation (FFT), the resulted spectra is ranged in 3.1-10.6 GHz when its power spectra density (PSD) is −51.3 dBm/MHz.

5. The Ultra-Wide Band (UWB) wireless system defined in claim 1, wherein the Gaussian light pulse signal generated by central station is transmitted to the base station by single mode optic fiber.

* * * * *